United States Patent
Lee et al.

(10) Patent No.: US 10,158,745 B2
(45) Date of Patent: Dec. 18, 2018

(54) VEHICLE AND COMMUNICATION CONTROL METHOD FOR DETERMINING COMMUNICATION DATA CONNECTION FOR THE VEHICLE

(71) Applicant: HYUNDAI MOTOR COMPANY, Seoul (KR)

(72) Inventors: Chang-Heon Lee, Yongin-si (KR); Hyun-woo Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/172,923

(22) Filed: Jun. 3, 2016

(65) Prior Publication Data

US 2017/0214778 A1    Jul. 27, 2017

(30) Foreign Application Priority Data

Jan. 27, 2016 (KR) .......... 10-2016-0010191

(51) Int. Cl.
  *H04M 1/27*  (2006.01)
  *H04M 1/2745*  (2006.01)
  (Continued)

(52) U.S. Cl.
  CPC ..... *H04M 1/271* (2013.01); *H04M 1/274575* (2013.01); *H04M 1/6091* (2013.01); *H04M 1/7253* (2013.01); *H04W 8/183* (2013.01)

(58) Field of Classification Search
  CPC ........ G07C 5/008; H04W 4/008; H04W 4/02; H04W 4/046; B60K 35/00; B60K 2350/1004; B60K 2350/1028; B60K 2350/1024; B60K 2350/357; H04L 67/12; H04L 51/38; H04L 12/5895; H04M 1/6075; H04M 1/6083; H04M 1/6091; H04M 1/271; H04M 2250/74; H04M 1/7253;
  (Continued)

(56) References Cited

U.S. PATENT DOCUMENTS 7,330,883 B1* 2/2008 Jessup .............. G06F 17/3087
                                                  455/414.3
2007/0129061 A1* 6/2007 Ringland ............ H04W 4/10
                                                  455/414.1

(Continued)

FOREIGN PATENT DOCUMENTS

JP    2001142486 A    5/2001
JP    2003-198713 A   7/2003
(Continued)

OTHER PUBLICATIONS

Notice of Allowance issued in Korean Patent Application No. 10-2017-0129181, dated Jun. 26, 2018 (English translation).

*Primary Examiner* — Allahyar Kasraian
(74) *Attorney, Agent, or Firm* — McDermott Will & Emery LLP

(57) ABSTRACT

A vehicle connected to a terminal of a user to perform dialing includes a speech input unit that receives a speech of the user, a speech recognition unit that recognizes a command included in the received speech, a control unit that determines a preparation state for performing the dialing, and a display unit that displays information about the preparation state when preparation for performing the dialing is not completed.

16 Claims, 13 Drawing Sheets

(51) Int. Cl.
*H04M 1/60* (2006.01)
*H04M 1/725* (2006.01)
*H04W 8/18* (2009.01)

(58) Field of Classification Search
CPC .... H04M 2201/40; G10L 15/22; G10L 15/32; G10L 15/01; G10L 2015/223; G10L 15/02; G10L 13/027; G10L 15/00; G10L 15/1822
USPC ..... 455/414.1, 566, 569.1, 569.2, 575.9, 99, 455/1–41.3, 563; 715/702, 703, 705–715, 715/764, 765, 771, 772; 704/246–250, 704/258–269
See application file for complete search history.

(56) References Cited

U.S. PATENT DOCUMENTS

2010/0100310 A1* 4/2010 Eich ................ G01C 21/3661
701/533
2011/0281573 A1* 11/2011 Otsuka ................ H04W 8/22
455/418

FOREIGN PATENT DOCUMENTS

| JP | 2010-048874 A | 3/2010 |
|---|---|---|
| KR | 10-2012-0017492 A | 2/2012 |
| KR | 10-2013-0011464 A | 1/2013 |
| KR | 10-2014-0127559 A | 11/2014 |
| KR | 10-1527518 B1 | 6/2015 |
| KR | 10-1572932 B1 | 11/2015 |

* cited by examiner

VEHICLE AND COMMUNICATION CONTROL METHOD FOR DETERMINING COMMUNICATION DATA CONNECTION FOR THE VEHICLE

CROSS-REFERENCE TO RELATED APPLICATION

This application claims the benefit of priority to Korean Patent Application No. 10-2016-0010191, filed on Jan. 27, 2016 with the Korean Intellectual Property Office, the disclosure of which is incorporated herein by reference.

TECHNICAL FIELD

Embodiments of the present disclosure relate to a vehicle that recognizes a user's speech and performs a specific function in accordance with the recognized speech.

BACKGROUND

In accordance with the development of a vehicle, a variety of functions for a user's convenience in addition to traveling, that is, a basic function performed by the vehicle, are often provided.

As the functions that can be performed by the vehicle have diversified, a user's operation load has increased and concentration on driving may be reduced, resulting in less safe driving. In addition, a user unskilled in handling a device may not properly utilize the functions offered by the vehicle.

accordingly, research and development for a user interface for reducing the user's operation load is required. In particular, when a speech recognition technology that recognizes a user's speech and performs a function corresponding to the recognized speech is applied to a vehicle, such a technology may be expected to effectively reduce the user's operation load.

SUMMARY

Therefore, it is an aspect of the present disclosure to provide a vehicle that may provide, when a user is not in a state capable of performing dialing even though attempting to perform dialing through speech recognition, information about this to the user and re-use an uttered command, and thereby may perform the dialing without interruption of the corresponding operation and a control method for the same.

Additional aspects of the disclosure will be set forth in part in the description which follows and, in part, will be obvious from the description, or may be learned by practice of the disclosure.

In accordance with one aspect of the present disclosure, a vehicle that is connected to a terminal of a user to perform dialing includes: a speech input unit that receives a speech of the user; a speech recognition unit that recognizes a command included in the received speech; a control unit that determines a preparation state for performing the dialing; and a display unit that displays information about the preparation state when preparation for performing the dialing is not completed.

Here, the display unit may display the information about the preparation state as a ratio of a progress of the preparation for performing the dialing and a state in which the preparation is completed.

Also, the display unit may display the information about the preparation state as a residual time remaining until the preparation for performing the dialing is completed.

Also, the control unit may determine at least one of whether the terminal and the vehicle are connected to each other, whether phone book data in which phone number information is stored is transmitted from the terminal, and whether a recognition phone book database (DB) is generated using the phone book data.

Also, the display unit may display a screen for guiding connection between the terminal and the vehicle, when the terminal and the vehicle are not connected to each other.

Also, the control unit may determine whether the recognized command is a command related to the dialing, and determine the preparation state for performing the dialing when the recognized command is the command related to the dialing.

Also, the vehicle may further include a storage unit that stores the received speech.

Also, the speech recognition unit may recognize the command included in the received speech using a basic DB used for speech recognition, before the preparation for performing the dialing is not completed.

Also, the speech recognition unit may re-recognize the command included in the speech stored in the storage unit using the recognition phone book DB, after the preparation for performing the dialing is completed.

Also, the speech recognition unit may calculate a confidence value for the recognized command, and the display unit may display a screen for guiding re-utterance of a command related to the dialing when the calculated confidence value is a preset threshold or smaller.

Also, the display unit may display a list including one or more commands related to the dialing.

In accordance with another aspect of the present disclosure, a control method for a vehicle that is connected to a terminal of a user to perform dialing includes: receiving a speech of the user; recognizing a command included in the received speech; determining whether the recognized command is a command related to the dialing; determining a preparation state for performing the dialing when the recognized command is the command related to the dialing; and displaying information about the preparation state when preparation for performing the dialing is not completed.

Here, the displaying may include displaying the information about the preparation state as a ratio of a progress of the preparation for performing the dialing and a state in which the preparation is completed.

Also, the displaying may include displaying the information about the preparation state as a residual time remaining until the preparation for performing the dialing is completed.

Also, the determining of the preparation state may include determining at least one of whether the terminal and the vehicle are connected to each other, whether phone book data in which phone number information is stored is transmitted from the terminal, and whether a recognition phone book DB is generated using the phone book data.

Also, the displaying may include displaying a screen for guiding connection between the terminal and the vehicle, when the terminal and the vehicle are not connected to each other.

Also, the control method may further include storing the received speech.

Also, the control method may further include re-recognizing the command included in the stored speech using the recognition phone book DB, when the preparation for performing the dialing is completed.

Also, the control method may further include calculating a confidence value for the recognized command when the preparation for performing the dialing is completed; and displaying a screen for guiding re-utterance of the command related to the dialing when the calculated confidence value is a preset threshold or smaller.

Also, the displaying of the screen for guiding re-utterance of the command related to the dialing may include displaying a list including one or more commands related to the dialing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, a vehicle and a control method for the same in accordance with embodiments of the present disclosure will be described in detail with reference to the accompanying drawings.

Figure 1:
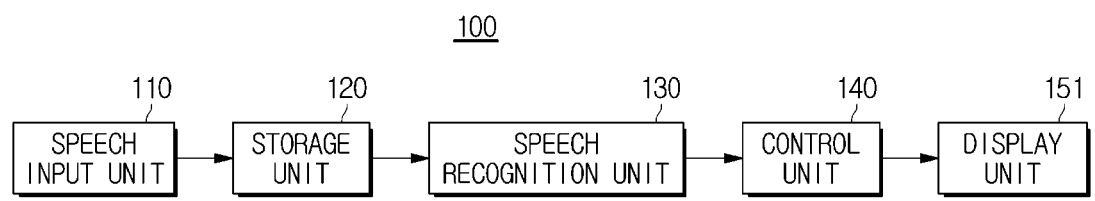
FIG. 1 is a control block diagram representing a vehicle in accordance with an embodiment of the present disclosure.

FIG. 1 is a control block diagram representing a vehicle in accordance with an embodiment of the present disclosure.

Referring to FIG. 1, a vehicle 100 may include a speech input unit 110 that receives a user's speech, a storage unit 120 that stores the received user's speech, a speech recognition unit 130 that recognizes the user's speech, a control unit 140 that controls an operation corresponding to the recognized speech to be executed, and a display unit 151 that displays information related to the operation corresponding to the recognized speech. In the embodiment of the disclosure, a user may include either or both of a driver and passenger on board a vehicle.

The speech input unit 110 may include a microphone, and convert, when speech of the user is input, the input speech into an electrical signal. The storage unit 120 may non-temporarily or temporarily store the user's speech, and the stored speech may be transmitted to the speech recognition unit 130. The storage unit 120 may include a non-volatile memory or a volatile memory. In addition, the storage unit 120 may be separately implemented as a buffer for storing speech, and store other information together.

The speech recognition unit 130 may include a speech recognition engine, and the speech recognition engine may recognize speech uttered by a user by applying a speech recognition algorithm to the input speech and generate a recognition result.

In such an instance, the input speech may be converted into a more useful form for speech recognition, and it may be possible to detect an actual speech interval included in the input speech by detecting start and end points from a speech signal. This is called end point detection (EPD).

Next, it may be possible to extract a characteristic vector of the input speech by applying a characteristic vector extraction technology such as Cepstrum, Linear Predictive Coefficient (LPC), Mel Frequency Cepstral Coefficient (MFCC), filter bank energy, or the like within the detected interval.

Next, it may be possible to obtain the recognition result through a comparison between the extracted characteristic vector and a trained reference pattern. For this, an acoustic model for modeling and comparing signal characteristics of speech and a language model for modeling a language ordering relationship such as words or syllables corresponding to a recognized vocabulary may be used.

The acoustic model may be classified into a direct comparison method that sets an object to be recognized as a characteristic vector model again and directly compares the characteristic vector model and a characteristic vector of speech data and a statistical model method that statistically processes and uses a characteristic vector of an object to be recognized.

The direct comparison method may be a method that sets a unit such as a word, a phoneme, or the like which is the object to be recognized as the characteristic vector model and compares how much input speech is similar to the characteristic vector model, and a vector quantization method is typically used as the direct comparison method. In the vector quantization method, a characteristic vector of input speech data may be mapped with a codebook that is a reference model, the obtained mapped values may be encoded into representative values, and these encoded values may be compared to each other.

The statistical model method is a method that configures a unit for the object to be recognized in a state sequence and uses a relationship between the state sequences. The state sequence may be constituted of a plurality of nodes. The method of using the relationship between the state sequences may be classified into methods using DTW (dynamic time warping), HMM (hidden Markov model), a neural network, and the like again.

DTW is a method that compensates for a difference on a time axis when speech data is compared to a reference model in consideration of a dynamic characteristic of the speech data in which a length of a corresponding signal varies over time even though the same person speaks the same pronunciation. HMM is a recognition technology in which speech data is assumed in a Markov process having a state transition probability and an observation probability of a node (output symbol) in each state, the state transition probability and the observation probability of the node are estimated through learning data, and then a probability that input speech occurs from the estimated model is calculated.

Meanwhile, in the language model for modeling the language ordering relationship such as words or syllables, it may be possible to reduce acoustic ambiguity and errors of recognition by applying an ordering relationship among units constituting a language to units obtained from the speech recognition. As the language model, a statistical language model and an FSA (finite state automata)-based model may be used, and in the statistical language model, a chain probability of words such as unigram, bigram, trigram, or the like may be used.

The speech recognition unit 130 may use any method of the above-described methods when recognizing speech. For example, the acoustic model to which the HMM is applied may be used, or an N-best search method in which the acoustic model and a speech model are combined may be used. In the N-best search method, up to N recognition result candidates are selected using the acoustic model and the language model and then the ranking of these candidates is re-estimated, thereby improving the recognition performance.

The speech recognition unit 130 may calculate a confidence value in order to ensure the reliability of the recognition result. The confidence value may be a measure indicating how much the speech recognition results are reliable. As an example, the confidence value may be defined as a relative value to a probability that corresponding speech is uttered from other phonemes or words, with respect to phonemes or words which are the recognized results. Accordingly, the confidence value may be expressed as a value of 0 to 1, or expressed as a value of 0 to 100.

When the confidence value exceeds a preset threshold, the recognition result may be output to the control unit 140 so that an operation corresponding to the recognition result may be performed, and when the confidence value is the threshold value or smaller, the recognition result may be rejected.

The speech recognition unit 130 may be implemented within a computer-readable recording medium using software, hardware, or a combination thereof. According to the implementation in a hardware manner, the speech recognition unit 130 may be implemented using at least one of electrical units such as ASICs (application specific integrated circuits), DSPs (digital signal processors), DSPDs (digital signal processing devices), PLDs (programmable logic devices), FPGAs (field programmable gate arrays), processors, micro-controllers, micro-processors, and the like.

According to the implementation in a software manner, the speech recognition unit 130 may be implemented together with a separate software module performing one or more functions or operations, and a software code may be implemented by a software application written by an appropriate program language.

The control unit 140 may control various components included in the vehicle 100 in order to perform an operation corresponding to the recognition result output by the speech recognition unit 130. The output recognition result may be a command included in a speech uttered by a user, and the control unit 140 may perform an operation mapped onto the recognized command. For example, when the recognized command is a command related to dialing, the control unit 140 may perform a control for dialing.

In addition, when being a state not capable of performing the operation mapped onto the recognized command, the control unit 140 may display the related information on the display unit 151 so as to induce a user to determine a current state and take an appropriate action corresponding to the current state. The related specific description will be described in detail below.

Figure 2:
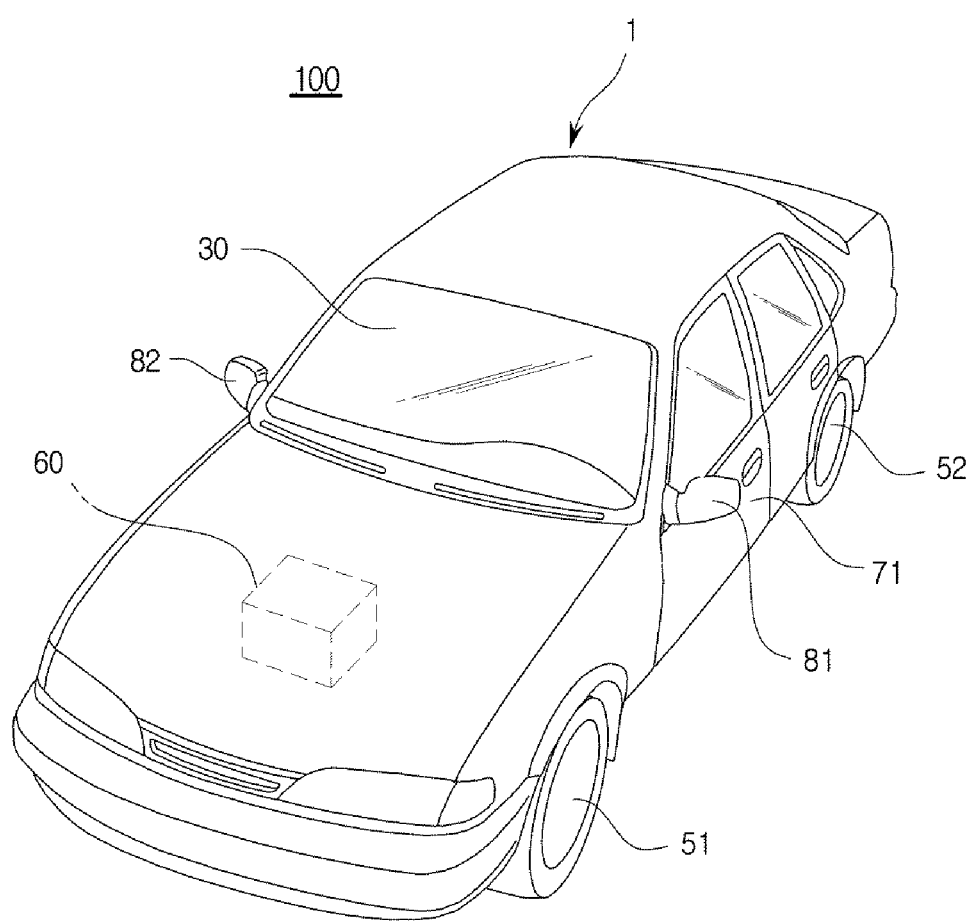
FIG. 2 is an outward appearance diagram illustrating a vehicle in accordance with an embodiment of the present disclosure when viewed from the outside.
Figure 3:
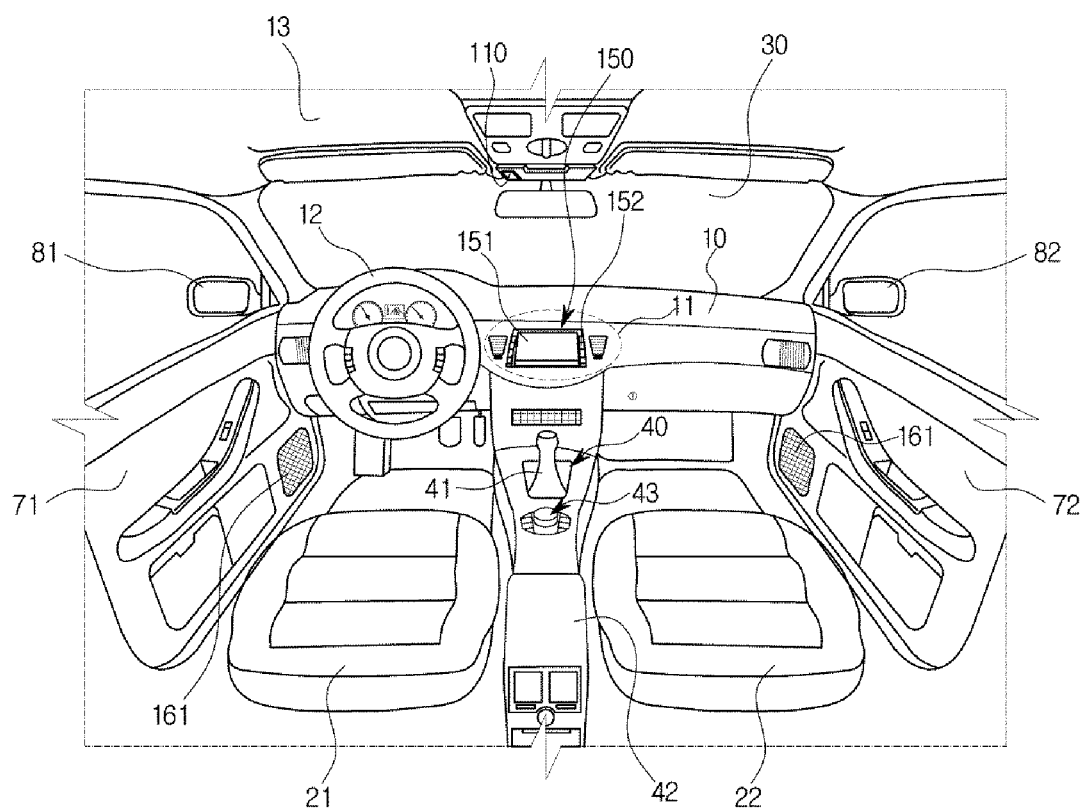
FIG. 3 is a diagram illustrating an internal configuration of a vehicle in accordance with an embodiment of the present disclosure.

FIG. 2 is an outward appearance diagram illustrating a vehicle in accordance with an embodiment of the present disclosure when viewed from the outside and FIG. 3 is a diagram illustrating an internal configuration of a vehicle in accordance with an embodiment of the present disclosure.

Referring to FIG. 2, the vehicle 100 in accordance with one embodiment of the present disclosure may include a main body 1 that forms an outward appearance of the vehicle 100, wheels 51 and 52 that move the vehicle 100, a driving device 60 that rotates the wheels 51 and 52, doors 71 and 72 (see FIG. 3) that shield the inside of the vehicle 100 from the outside, a front glass 30 that provides a front view of the vehicle 100 to a driver inside the vehicle 100, and side mirrors 81 and 82 that provide a rear view of the vehicle 100 to the driver.

The wheels 51 and 52 include a front wheel 51 provided at a front side of the vehicle and a rear wheel 52 provided at a rear side of the vehicle, and the driving device 60 provides a rotational force to the front wheel 51 and/or the rear wheel 52 so that the main body 1 is moved to the front side or the rear side. Such a driving device 60 may employ an engine for generating a rotational force by burning a fossil fuel or a motor for generating a rotational force by receiving power from a capacitor or battery (not shown).

The doors 71 and 72 may be rotatably provided at left and right sides of the main body 1, allow a driver to get in the vehicle 100 when they are opened, and shield the inside of the vehicle 100 from the outside when they are closed.

The front glass 30 may be provided at a front upper portion of the main body 1 so that a driver may obtain visual information of a front side of the vehicle 100, also referred to as a windshield glass.

In addition, the side mirrors 81 and 82 may include a left side mirror 81 provided at the left side of the main body 1 and a right side mirror 82 provided at the right side thereof, so that a driver positioned inside the vehicle 100 may obtain visual information of a lateral and rear sides of the vehicle 100.

In addition, the vehicle 100 may include sensors such as a proximity sensor for detecting obstacles or other vehicles positioned at the rear or lateral sides, a rain sensor for detecting whether it is raining, and the like.

The internal configuration of the vehicle 100 will be described with reference to FIG. 3.

An AVN (audio video navigation) device 150 may be provided in a center facia 11 that may be a central area of a dashboard 10. The AVN device 150 may be a device that comprehensively performs audio, video, and navigation functions or performs some of these functions, and the display unit 151 may selectively display at least one of an audio screen, a video screen, and a navigation screen, and display various control screens related to the control of the vehicle 100, a screen showing information about a state of the vehicle, or a screen related to additional functions which are executable in the AVN device 150.

The display unit 151 may be implemented as one of various display devices such as an LCD (liquid crystal display), an LED (light emitting diode), a PDP (plasma display panel), an OLED (organic light emitting diode) a CRT (cathode ray tube), and the like.

A user may input a command for controlling the AVN device 150 by manipulating an input unit 152. The input unit 152 may be provided with a hard key type in an area adjacent to the display unit 151 as shown in FIG. 3, and the display unit 151 may also perform the function of the input unit 152 when the display unit 151 is implemented with a touch screen type.

A center input unit 43 as a jog shuttle type or a hard key type may be provided in a center console 40. The center console 40 may refer to a portion positioned between a driver's seat 21 and a passenger seat 22 and in which a gear control lever 41 and a tray 42 are formed. The center input unit 43 may perform all or some functions of the input unit 152 included in the AVN device 150.

The vehicle 100 in accordance with one embodiment of the present disclosure may receive a control command input by a physical operation on the input unit by a user as speech, through the speech input unit 110.

The speech input unit 110 may be mounted in a head lining 13 for an effective input of speech as shown in FIG. 3, but an embodiment of the vehicle 100 is not limited thereto, and thus the speech input unit 110 may be mounted on the dashboard 10 or on a steering wheel 12. There is no limitation in the position of the speech input unit 110 as long as the speech input unit 110 is located in a position suitable for receiving a user's speech.

A speaker 161 capable of outputting sound may be provided inside the vehicle 100, and sound required for performing audio, video, and navigation functions and other additional functions may be output through the speaker 161, and sound for providing information required for a user may be output.

Figure 4:
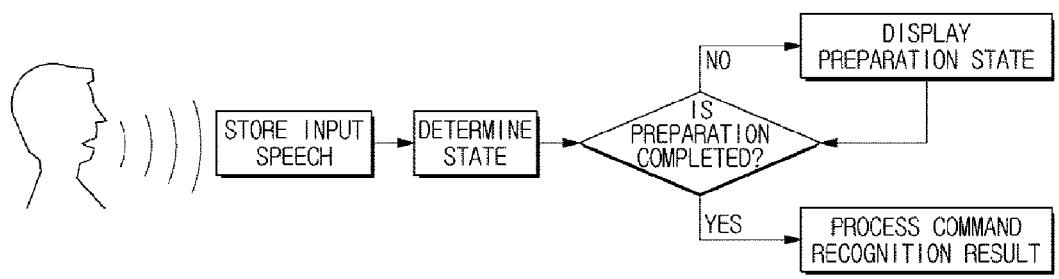
FIG. 4 is a flowchart illustrating a process of an operation performed by a vehicle through speech recognition in accordance with one embodiment of the present disclosure.

FIG. 4 is a flowchart illustrating a process of an operation performed by a vehicle through speech recognition in accordance with one embodiment of the present disclosure.

As an example, the vehicle 100 may perform dialing by recognizing a user's speech. In an embodiment which will be described below, dialing will be described in detail as an operation of the vehicle 100.

When a user inputs a speech including a command for performing dialing using the vehicle 100 through the speech input unit 110, the speech input unit 110 may convert the input speech into an electrical signal, and the storage unit 120 may store the speech converted into the electrical signal.

The control unit 140 may determine whether preparation for performing dialing is currently completed, process a command recognition result when the preparation is completed, and display a preparation condition to provide information about a current state to the user when the preparation is not completed.

Specifically, in order to determine whether the preparation for performing dialing is completed, the control unit 140 may determine whether a database, which is used to determine whether the vehicle 100 is connected to a user's terminal, whether data of a phone book stored in the user's terminal is transmitted to the vehicle 100, and whether the data of the phone book is included in a command uttered by a user, is generated. Here, the user's terminal may be an electronic apparatus capable of performing a dialing function such as a smart phone, a tablet PC, a smart watch, a smart glass, or the like, and there is no limitation in the kind of the user's terminal.

The vehicle 100 and the user's terminal may be connected to each other in a wired or wireless manner. When they are connected in the wireless manner, a variety of wireless communication methods may be applied, and for this, an appropriate wireless communication module may be provided in the vehicle 100 and the user's terminal. As an example, the vehicle 100 and the user's terminal may be connected to each other through a Bluetooth communication method, and for this, a Bluetooth communication module may be included in the vehicle 100 and in the user's terminal.

The phone book stored in the user's terminal may include names or titles and telephone number information mapped onto the names or titles. In the embodiment which will be described below, information included in the phone book may be referred to as phone book data.

When receiving phone book data from the user's terminal connected to the vehicle 100, that is, when downloading the phone book data, a user may utter a name or a title stored in the phone book data, and perform dialing to a phone number mapped onto the uttered name or title. For this, the control unit 140 may generate a recognition phone book database (DB) used for speech recognition after downloading the phone book data, and the speech recognition unit 130 may determine whether the command uttered by the user includes the name or title included in the recognition phone book DB.

That is, in order to perform dialing through speech recognition, connection between the terminal and the vehicle 100, downloading of the phone book data and generation of the recognition phone book DB should be previously carried out. Accordingly, in order to determine whether the preparation for performing dialing by the vehicle 100 is completed, the control unit 140 may determine at least one of a connection between the terminal and the vehicle 100, downloading of the phone book data, and generation of the recognition phone book DB. In some cases, when the at least one thereof is completed, it may be determined that the preparation for performing dialing is completed, and only when connection between the terminal and the vehicle 100, downloading of the phone book data, and generation of the recognition phone book DB are all completed, may it be determined that the preparation for performing dialing is completed.

As an example, dialing may be performed without using the phone book data, and in this case, only whether the terminal and the vehicle are connected to each other may be determined.

When the preparation for performing dialing is not completed based on the determination result of the control unit 140, it may be possible to provide information about a current preparation state to a user, and as an example, it may be possible to visually provide information through the display unit 151. Hereinafter, a method of providing visual information will be described with reference to FIGS. 5 to 8.

FIGS. 5 to 8 are diagrams illustrating examples of a screen showing a preparation state for performing dialing.

Figure 5:
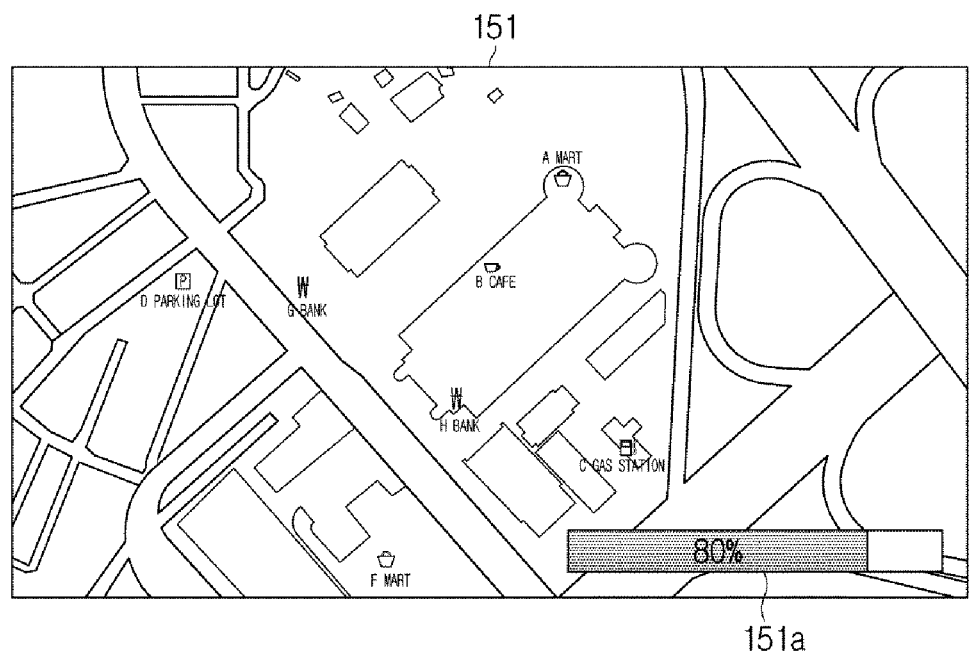
FIGS. 5 to 8 are diagrams illustrating examples of a screen showing a preparation state for performing dialing.
Figure 6:
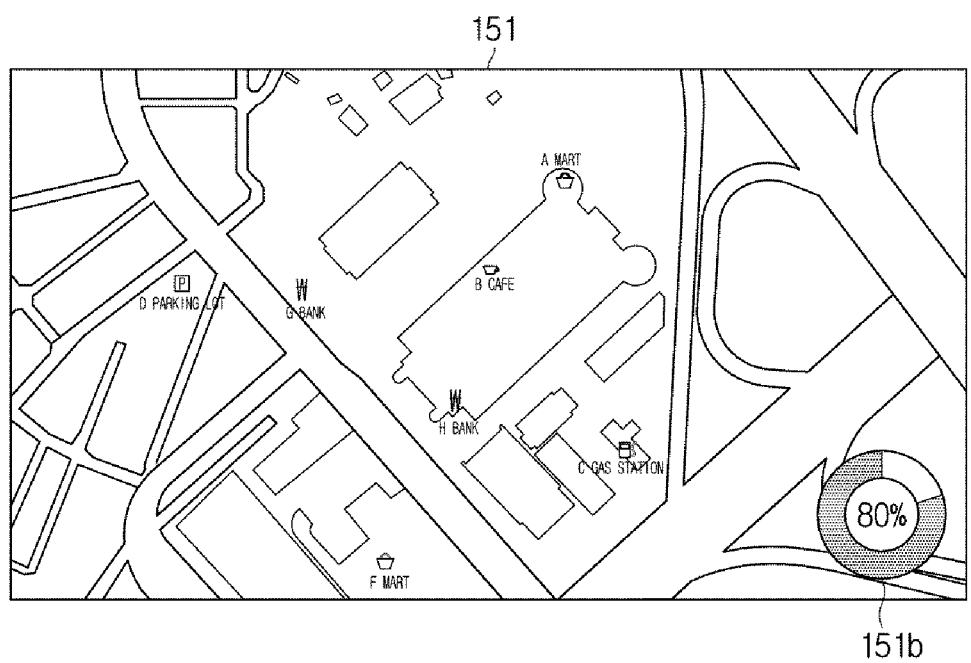

Referring to FIGS. 5 and 6, the display unit 151 may display progress bars 151a and 151b on an area thereof and provide information about a preparation state. For example, the current preparation state may be expressed in a percentage, and a user may confirm that the preparation for performing dialing is 80% completed when viewing the progress bars 151a and 151b, and therefore it is possible to determine when dialing can be performed.

Figure 7:
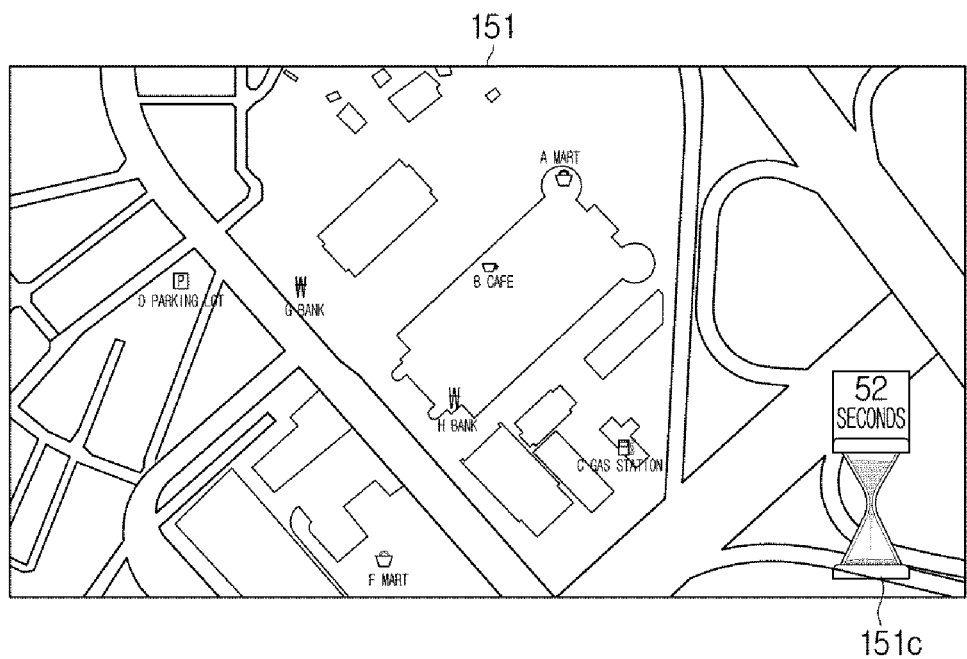
Figure 8:
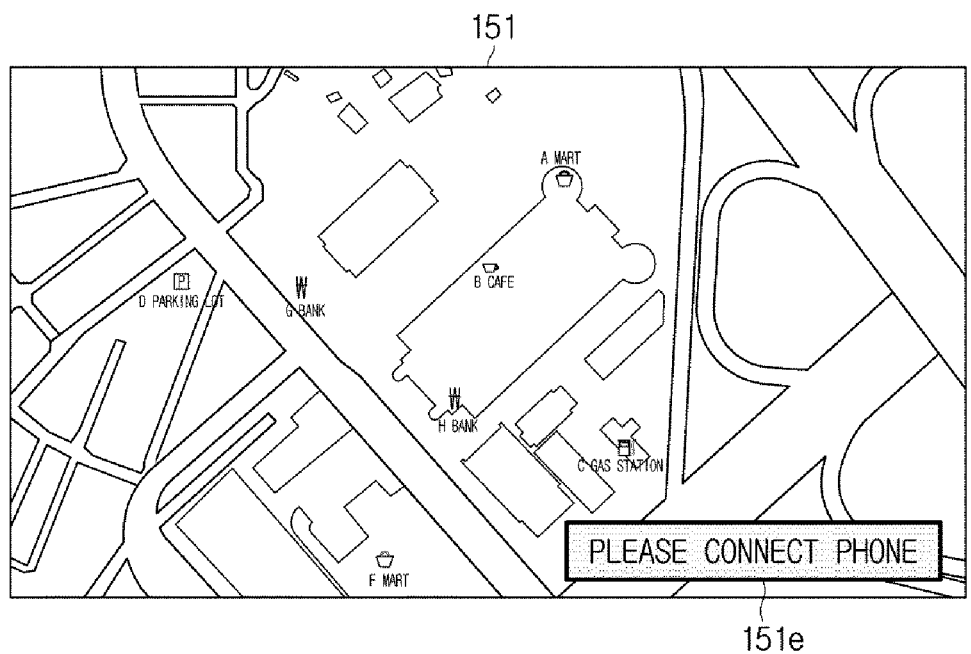

Alternatively, in order to more intuitively provide the information about the current preparation state, it may be possible to display an icon 151c indicating a residual time remaining until the preparation is completed as shown in FIG. 7. Alternatively, it is possible to display the residual time in the form of a progress bar. There is no limitation in a method of providing the information about the preparation state. In addition, it is possible to provide visual information using the display unit 151 and also possible to provide audible information using the speaker 161.

In this manner, when the preparation for performing dialing is not completed, the vehicle 100 in accordance with one embodiment may allow the user to determine when dialing using the speech recognition can be performed by providing the information about the current state to the user rather than immediately terminating the speech recognition.

Meanwhile, when a user's terminal is not connected to the vehicle 100, a user's operation for connection of the terminal to the vehicle may be required. Accordingly, in this case, a pop-up 151e including information requiring the connection of the terminal may be displayed on the display unit 151.

In addition, when the preparation for performing dialing is not completed, the display unit 151 may display a screen prior to performing speech recognition again, so that it is possible to allow the user to continuously use an originally used function until the preparation is completed. As an example, when the user uses a navigation function, the display unit 151 may return to a route guidance screen and perform route guidance until the preparation for performing dialing is completed.

Figure 9:
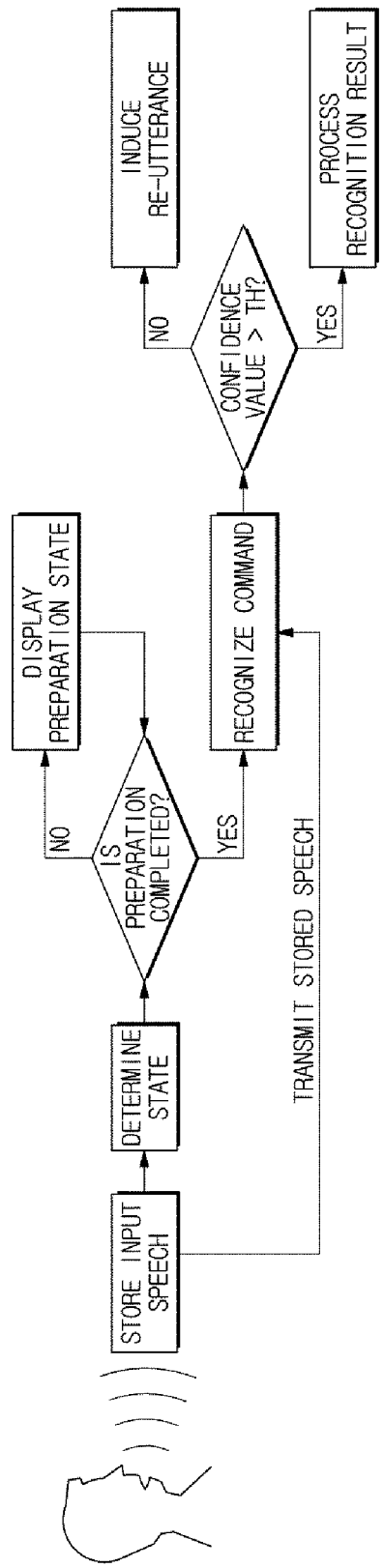
FIG. 9 is a flowchart illustrating an operation after preparation for performing dialing is completed.
Figure 10:
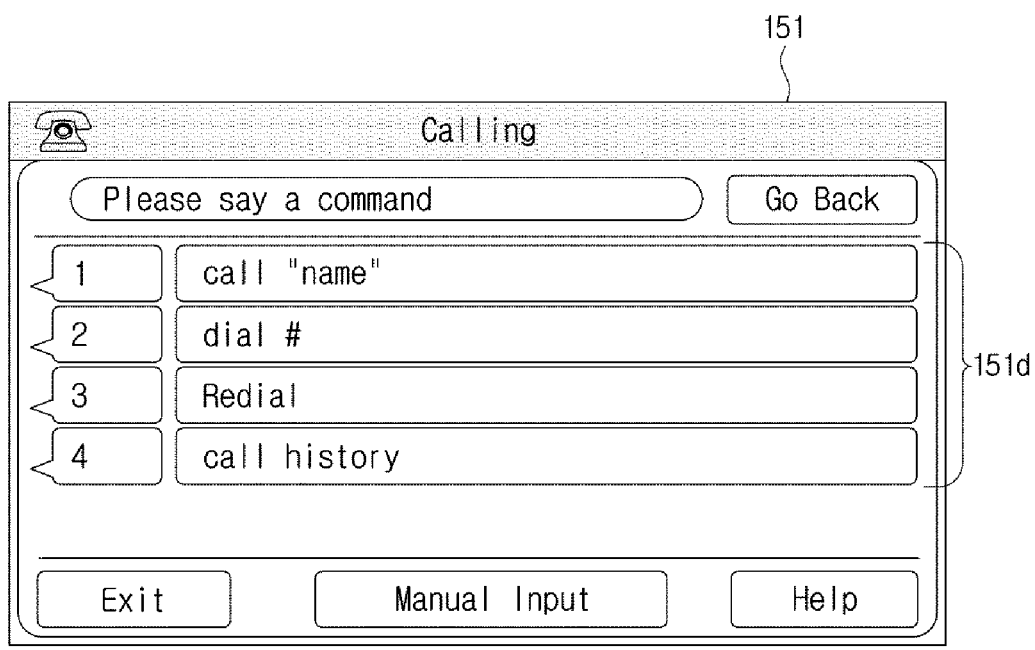
FIG. 10 is a diagram illustrating an example of a screen for inducing re-utterance of a user.

FIG. 9 is a flowchart illustrating an operation after preparation for performing dialing is completed, and FIG. 10 is a diagram illustrating an example of a screen for inducing re-utterance of a user.

Referring to FIG. 9, a process of storing input speech, determining the preparation state, and displaying the preparation state when the preparation is not completed may be the same as the process described in FIG. 4.

When the preparation for performing dialing is completed, the speech recognition unit 130 may receive a speech stored in the storage unit 120 and recognize a command included in the received speech. In this instance, it may be possible to recognize the command using the recognition phone book DB.

As described above, the speech recognition unit 130 may calculate a confidence value for the recognized command, and determine that the reliability of the result is ensured when the confidence value exceeds a preset threshold (TH) and thereby process a recognition result corresponding to the command. For example, when the recognized command corresponds to a name or a title included in the recognition phone book DB, it may be possible to perform dialing to a phone number mapped onto the corresponding name or title.

However, when the confidence value is the preset threshold (TH) or smaller, it may be possible to induce re-utterance of the user. In this case, as shown in FIG. 10, it is possible to guide the user to readily determine which command the user should utter in a current stage by displaying a detailed guidance screen 151d related to dialing on the display unit 151.

As the command that can be uttered to perform dialing, "call name", "dial #", "redial", "call history", and the like may be used as shown in the example of FIG. 10. Here, "name" refers to a name or a title desired by the user, and "#" refers to a phone number desired by the user.

When the user utters "call name", dialing to a phone number mapped onto the corresponding name or title may be performed, when the user utters "dial #", dialing to the corresponding phone number may be performed, when the user utters "redial", re-dialing to the most recently dialed phone number may be performed, and when the user utters "call history", a recent call list may be displayed on the display unit 151.

Figure 11:
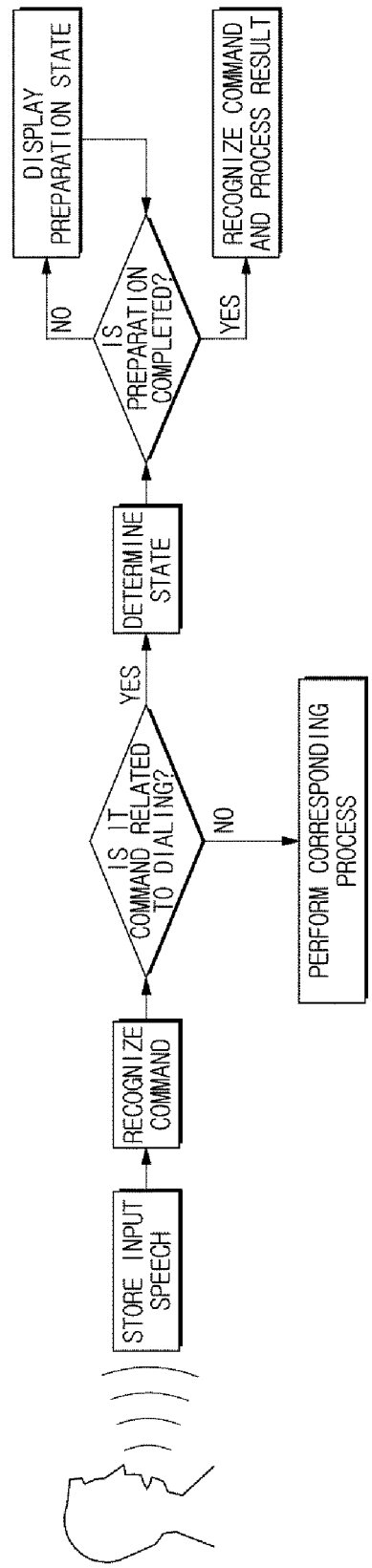
FIG. 11 is an operational flowchart illustrating a step for determining a dialing preparation state in more detail.

FIG. 11 is an operational flowchart illustrating a step for determining a dialing preparation state in more detail.

Referring to FIG. 11, when a user inputs a speech using the speech input unit 110, the storage unit 120 may store the input speech, and the speech recognition unit 130 may recognize the input speech. That is, the speech recognition unit 130 may recognize a command included in the input speech. In this instance, the speech recognition unit 130 may use its own basic DB.

When the recognized command is a command related to dialing, for example, when a command such as "call", "dial" or the like is included in the recognized command, the control unit 140 may determine that a user's intention is to perform dialing, and determine whether preparation for performing dialing is completed. The command related to dialing may be included in the basic DB, and information about which command is the command related to dialing may be stored in the storage unit 120 or the control unit 140 in advance.

When the preparation for performing dialing is not completed, a preparation condition may be displayed, and when the preparation for performing dialing is completed, the speech recognition unit 130 may recognize the command and perform a process corresponding to the recognition result. In this instance, the speech recognition unit 130 may recall the speech stored in the storage unit 120 and recognize the speech using the recognition phone book DB rather than the basic DB.

When the recognized command is not a command related to dialing, the corresponding process to the recognized command may be performed. For example, when the recognized command is a command for controlling an audio, video, or navigation function, the corresponding process may be performed.

That is, according to the present example, only when the command uttered by the user is the command related to dialing, a dialing preparation state may be determined, thereby preventing an unnecessary, or alternate, operation from being performed.

However, embodiments of the vehicle are not limited thereto, and therefore it is possible to immediately determine whether the preparation for performing dialing is completed when a user's speech is input, regardless of whether the command uttered by the user is the command related to dialing.

Hereinafter, an embodiment of a control method for a vehicle will be described.

In the control method for the vehicle in accordance with one embodiment, the above-described vehicle 100 may be used. Accordingly, the above-descriptions made with reference to FIGS. 1 to 11 may be applied to the control method for the vehicle.

Figure 12:
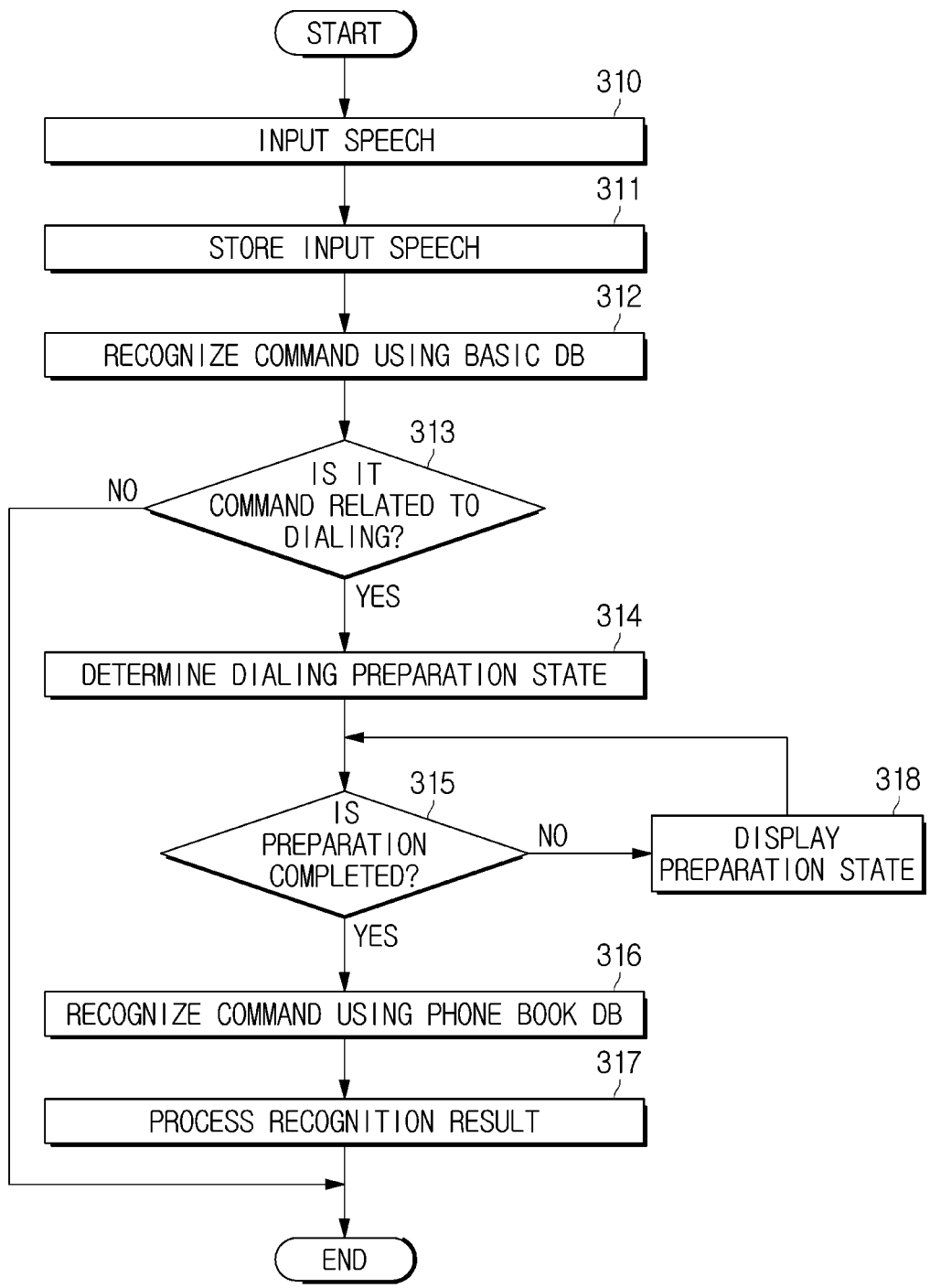
FIG. 12 is a flowchart illustrating a control method for a vehicle in accordance with an embodiment of the present disclosure.

FIG. 12 is a flowchart illustrating a control method for a vehicle in accordance with an embodiment of the present disclosure.

Referring to FIG. 12, in operation 310, the control method for the vehicle may receive a speech uttered by a user using the speech input unit 110. As an example, the speech input unit 110 may be turned on by a user's operation.

The storage unit 120 may store the input speech in operation 311, and the speech recognition unit 130 may recognize a command included in the user's speech using the basic DB in operation 312.

The control unit 140 may determine whether the recognized command is a command related to dialing in operation 313. For example, when a command such as "call" or "dial" is included in the command, it may be determined that the recognized command is a command related to dialing.

When the recognized command is not a command related to dialing (NO of operation 313), the corresponding process for performing dialing may be terminated, and a process corresponding to the recognized command may be performed.

When the recognized command is a command related to dialing (YES of operation 313), a dialing preparation state may be determined in operation 314. For example, whether a user's terminal is connected to the vehicle 100, whether phone book data is downloaded, and whether a recognition phone book DB is generated may be determined. When even one of these is not completed, it may be determined that preparation for performing dialing is not completed.

When the preparation for performing dialing is not completed (NO of operation 315), the preparation state may be displayed in operation 318. For example, the progress bars 151a and 151b showing the preparation state in percentage may be displayed on an area of the display unit 151, and the icon 151c indicating a residual time remaining until the preparation is completed may be displayed. There is no limitation regarding a method of providing the information about the preparation state. In addition, it may be possible to provide visual information using the display unit 151 and also possible to provide audible information using the speaker 161.

When the preparation is completed (YES of operation 315), the corresponding command may be recognized using the recognition phone book DB in operation 316, and the recognition result may be processed in operation 317. In this instance, it may be possible to recall and recognize the speech stored in the storage unit 120 even when the user does not re-utter the corresponding command. The processing of the recognition result refers to the performance of an operation corresponding to the recognized command, and therefore when a name or a title is included in the recognized command, it may be possible to perform dialing to a phone number mapped onto the corresponding name or title, and when a phone number is included in the recognized command, it may be possible to perform dialing to the corresponding phone number, and when redial is included in the recognized command, it may be possible to perform re-dialing to the most recently dialed phone number.

Figure 13:
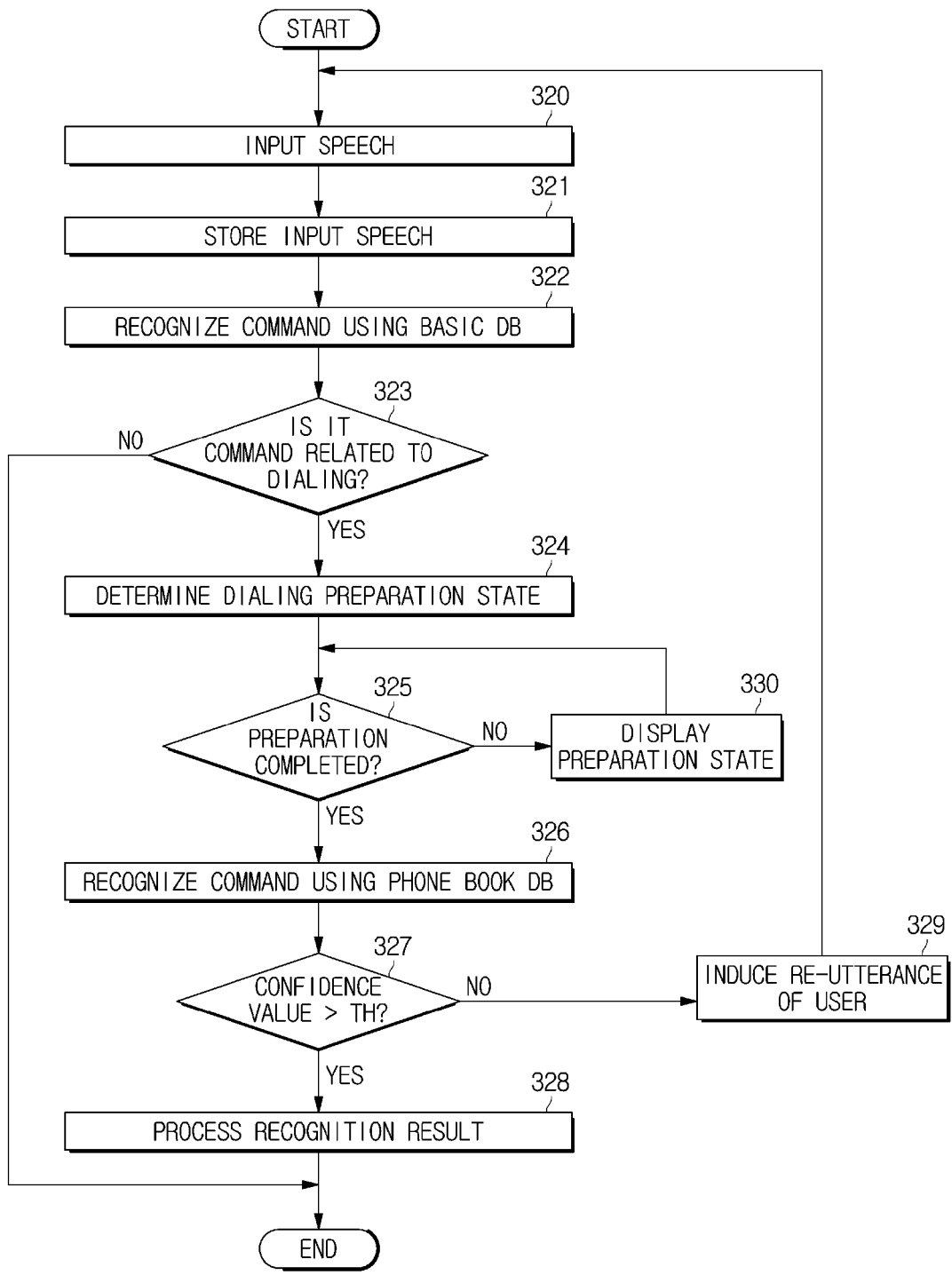
FIG. 13 is a flowchart illustrating a process of processing a recognition result in a control method for a vehicle in accordance with an embodiment of the present disclosure.

FIG. 13 is a flowchart illustrating a process of processing a recognition result in a control method for a vehicle in accordance with an embodiment of the present disclosure.

Referring to FIG. 13, the process of receiving a speech from a user in operation 320, storing the received speech in operation 321, recognizing a command using a basic DB in operation 322, determining a dialing preparation state in operation 324 when the recognized command is a command related to dialing (YES of operation 323), and displaying a preparation state in operation 320 when preparation for performing dialing is not completed (NO of operation 325) may be the same as the above-described example of FIG. 12.

When the preparation for performing dialing is completed (YES of operation 325), the corresponding command is recognized using the recognition phone book DB in operation 326, and a confidence value for the recognized command is calculated.

When the confidence value exceeds a preset threshold (TH), the recognition result may be processed, and when the confidence value does not exceed the preset threshold (TH), re-utterance of a user may be induced in operation 329. In the latter case, it may have been already confirmed that a user's intention is to perform dialing through speech recognition, and therefore it may be possible to display a screen for guiding the user's utterance related to dialing as shown in FIG. 10 described above.

In the examples of FIGS. 12 and 13, a follow-up action such as determining the dialing preparation state may be performed when the command included in the input speech is the command related to dialing, but an embodiment of the control method for the vehicle is not limited thereto. Similar to the aforementioned embodiment of the vehicle, the dialing preparation state may be determined, regardless of whether the command included in the input speech is a command related to dialing.

According to the vehicle and the control method for the vehicle according to the above-described embodiments, when a user is not in a state capable of performing dialing even though the user is attempting to perform dialing through speech recognition, information about such a situation may be provided to the user and an uttered command may be reused, thereby performing dialing without interruption of the corresponding operation.

In addition, when the confidence value of the recognition result is the threshold or smaller, the detailed guidance screen including the command related to dialing may be provided, thereby inducing the user to re-utter an appropriate command.

The foregoing embodiments have been provided to illustrate the structural and functional principles of the present disclosure, and are not intended to be limiting. To the contrary, the present disclosure is intended to encompass all modifications, alterations, and substitutions within the scope of the appended claims. While the disclosure has been described with reference to certain exemplary embodiments thereof, those skilled in the art may make various modifications to the described embodiments of the disclosure without departing from the scope of the disclosure. The terms and descriptions used herein are set forth by way of illustration only and not meant as limitations. In particular, although the present disclosure has been described by way of examples, a variety of devices would practice the inventive concepts described herein. Although the disclosure has been described and disclosed in various terms and certain embodiments, the scope of the disclosure is not intended to be, nor should it be deemed to be, limited thereby and such other modifications or embodiments as may be suggested by the teachings herein are particularly reserved, especially as they fall within the breadth and scope of the claims here appended.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. In the specifications, it should be understood that the terms "comprising," or "including" when used in these specifications, specify the presence of stated features, integers, steps, operations, elements, and components, but do not preclude the presence or addition of one or more other features, integers, steps, operations, elements, components, and a combination thereof.

In addition, terms such as "-unit", "-er(-or)", and the like used in the present specification may refer to a unit that performs at least one function or operation.

What is claimed is:

1. A vehicle connected to a terminal of a user to perform dialing, the vehicle comprising:
    a speech input unit configured to receive a speech of the user;
    a speech recognition unit configured to recognize a command included in the received speech;
    a processor configured to determine a preparation state for performing the dialing; and
    a display configured to display information about the preparation state when preparation for performing the dialing is not completed;

wherein the processor is configured to determine at least one of whether the terminal and the vehicle are connected to each other, whether phone book data in which phone number information is stored is transmitted from the terminal and whether a recognition phone book database (DB) is generated using the phone book data, wherein the display is configured to display a screen for guiding connection between the terminal and the vehicle when the terminal and the vehicle are not connected to each other, wherein the speech input unit comprises a microphone, wherein the speech recognition unit comprises a speech recognition engine, the speech recognition engine configured to recognize speech uttered by the user by applying a speech recognition algorithm to the input speech and generate a recognition result, and wherein the processor is configured to maintain the speech recognition when the preparation for performing dialing is not completed.

2. The vehicle according to claim 1, wherein the display is configured to display the information about the preparation state as a ratio of a progress of the preparation for performing the dialing and a state in which the preparation is completed.

3. The vehicle according to claim 1, wherein the display is configured to display the information about the preparation state as a residual time remaining until the preparation for performing the dialing is completed.

4. The vehicle according to claim 1, wherein the processor is configured to determine whether the recognized command is a command related to the dialing and determines the preparation state for performing the dialing when the recognized command is a command related to the dialing.

5. The vehicle according to claim 4, further comprising a storage unit that is configured to store the received speech.

6. The vehicle according to claim 5, wherein the speech recognition unit is configured to recognize the command included in the received speech using a basic DB used for speech recognition before the preparation for performing the dialing is not completed.

7. The vehicle according to claim 6, wherein the speech recognition unit is configured to re-recognize the command included in the speech stored in the storage unit using the recognition phone book DB after the preparation for performing the dialing is completed.

8. The vehicle according to claim 1, wherein the speech recognition unit is configured to calculate a confidence value for the recognized command and the display displays a screen for guiding re-utterance of a command related to the dialing when the calculated confidence value is a preset threshold or smaller.

9. The vehicle according to claim 8, wherein the display is configured to display a list including one or more commands related to the dialing.

10. A control method for a vehicle that is connected to a terminal of a user to perform dialing, the control method comprising:

receiving a speech of the user;

recognizing a command included in the received speech;

determining whether the recognized command is a command related to the dialing;

determining a preparation state for performing the dialing when the recognized command is the command related to the dialing;

displaying information about the preparation state when a preparation for performing the dialing is not completed; and maintaining the speech recognition when the preparation for performing dialing is not completed, wherein the step for determining the preparation state includes determining at least one of whether the terminal and vehicle are connected to each other, whether phone book data in which phone number information is stored is transmitted from the terminal and whether a recognition phone book DB is generated using the phone book data, and wherein the step for displaying information includes displaying a screen for guiding a connection between the terminal and the vehicle, when the terminal and the vehicle are not connected to each other.

11. The control method according to claim 10, wherein the step for displaying information includes displaying the information about the preparation state as a ratio of a progress of the preparation for performing the dialing and a state in which the preparation is completed.

12. The control method according to claim 10, wherein the step for displaying information includes displaying the information about the preparation state as a residual time remaining until the preparation for performing the dialing is completed.

13. The control method according to claim 10, further comprising storing the received speech.

14. The control method according to claim 13, further comprising re-recognizing the command included in the stored speech using the recognition phone book DB when the preparation for performing the dialing is completed.

15. The control method according to claim 10, further comprising:

calculating a confidence value for the recognized command when the preparation for performing the dialing is completed; and displaying a screen for guiding re-utterance of the command related to the dialing when the calculated confidence value is a preset threshold or smaller.

16. The control method according to claim 15, wherein the step for displaying the screen for guiding re-utterance of the command related to the dialing includes displaying a list including one or more commands related to the dialing.

* * * * *